United States Patent

[11] 3,587,156

[72] Inventor Gerald T. Sorenson
Hartland, Wis.
[21] Appl. No. 668,862
[22] Filed Sept. 19, 1967
[45] Patented June 28, 1971
[73] Assignee Systems Design Company, Inc.,
Milwaukee, Wis.

[54] METHOD OF MANUFACTURING A PRESSURIZED FLUID CONTROL VALVE
8 Claims, 33 Drawing Figs.

[52] U.S. Cl. .................................................. 29/156.7,
29/157.1, 29/453, 29/557, 137/625.48, 137/625.66
[51] Int. Cl. ................................................. B21k 1/20,
B23p 13/00, F16k 11/02
[50] Field of Search .......................................... 29/157.1,
156.7, 45.3, 529, 557; 137/625.48, 625.66

[56] References Cited
UNITED STATES PATENTS
3,216,443  10/1965  Schmiel .................. 29/157.1
3,251,260  5/1966  Serdechny ............... 29/453
3,052,013  9/1962  Kane ........................ 29/157.1

OTHER REFERENCES
Rusinoff, MANUFACTURING PROCESSES, 1962, pp. 43—45, 118—119, and 628—629.

Primary Examiner—John F. Campbell
Assistant Examiner—Robert J. Craig
Attorney—Robillard and Byrne ABSTRACT: A valve for controlling the flow of pressurized fluid having a valve body including a plurality of fluid entrance and emission ports opening into a confined cavity. A valve spool is held captive in the cavity and is movable therein to control the flow of fluid selectively through the ports and the cavity. At least one of the valve members is constructed of resilient material. Such use of resilient material not only results in a unique valve structure but also permits production thereof by a unique method wherein either the valve body or the valve spool is deformed for the assembly of parts.

Inventor
Gerald T. Sorenson
By Lieber & Nilles
Attorneys

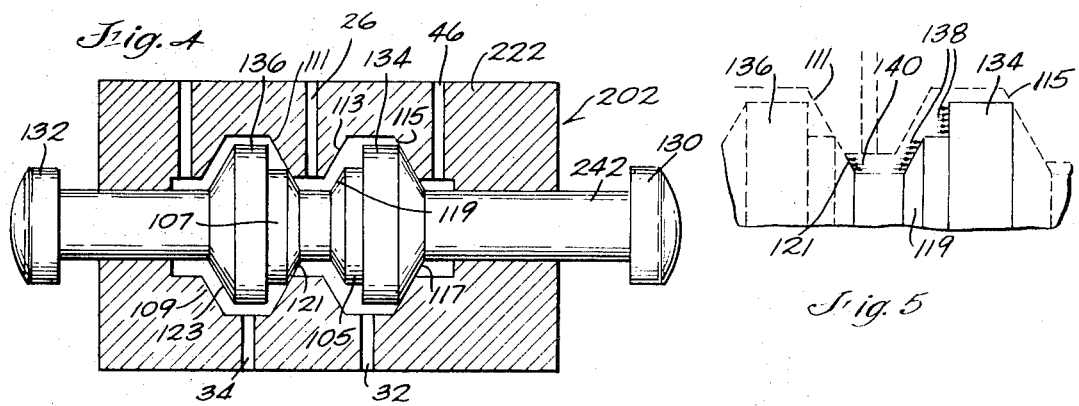
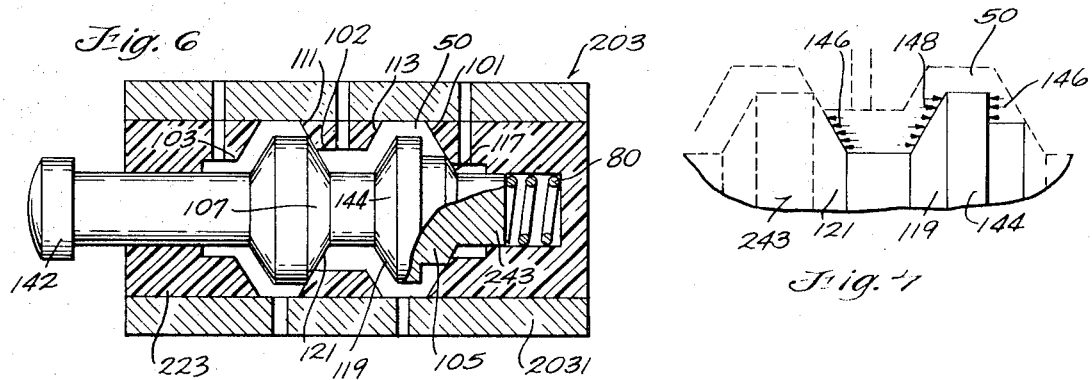
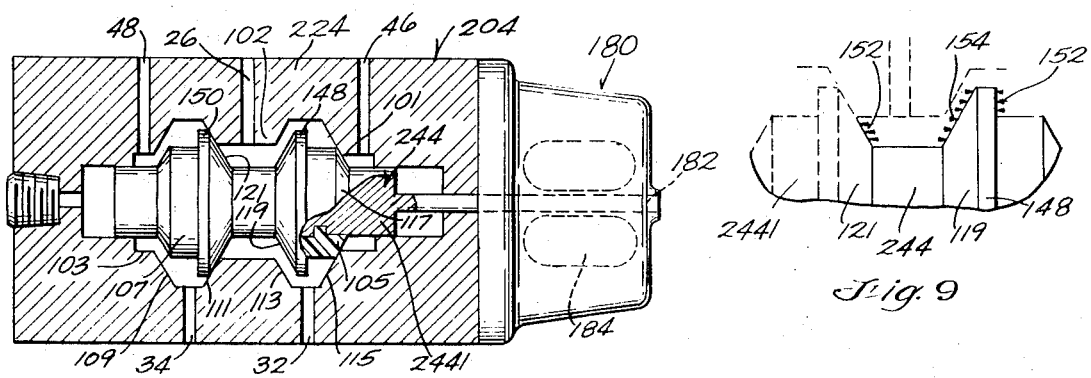

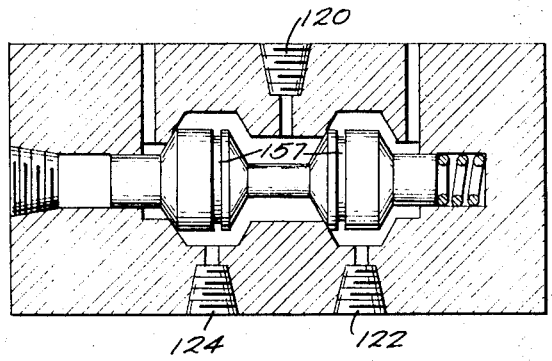
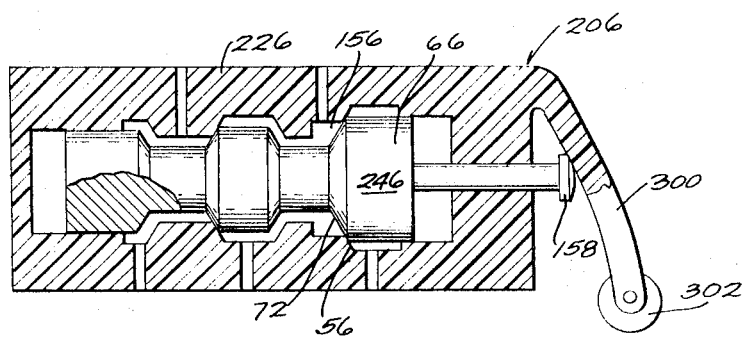
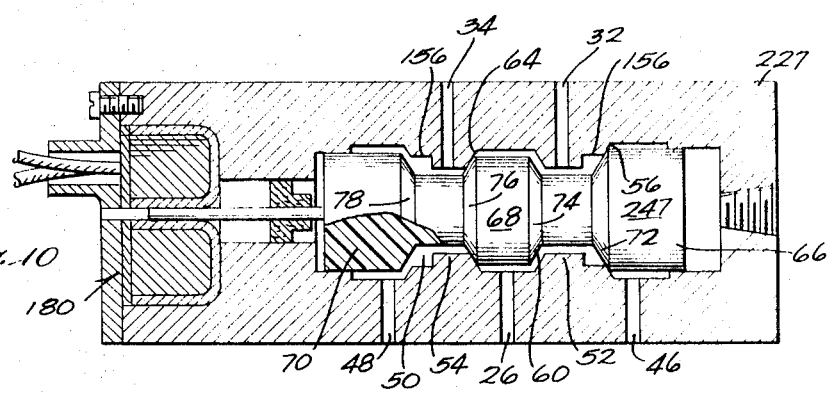
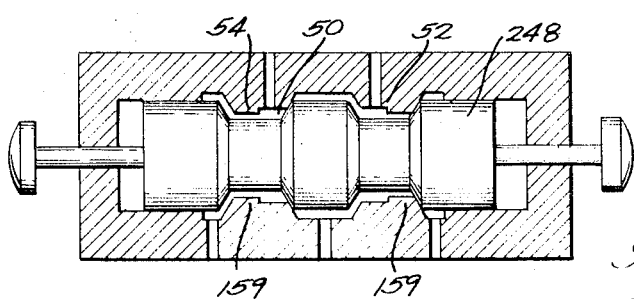

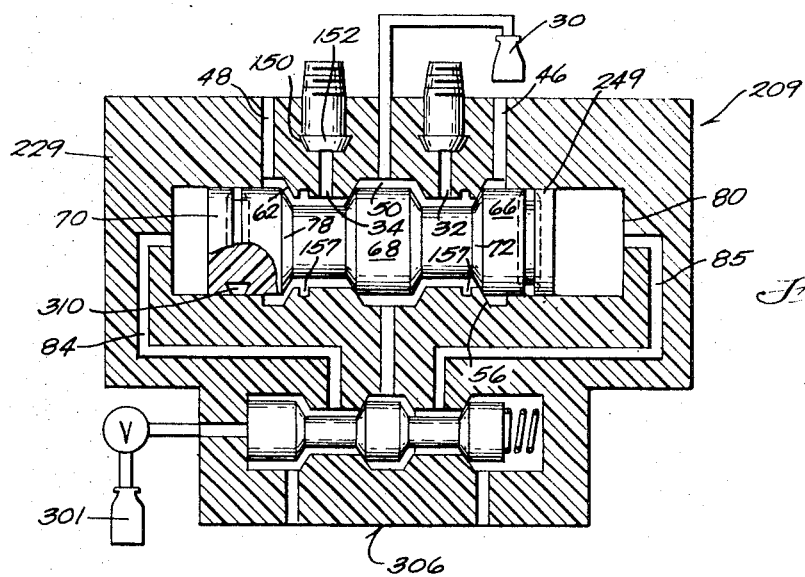
Fig. 11
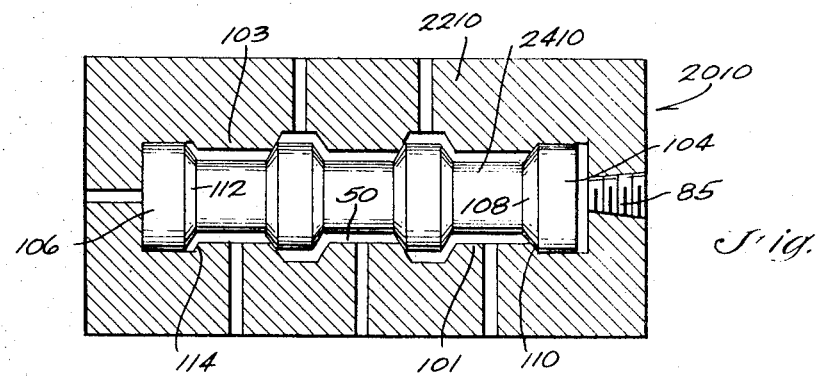
Fig. 14
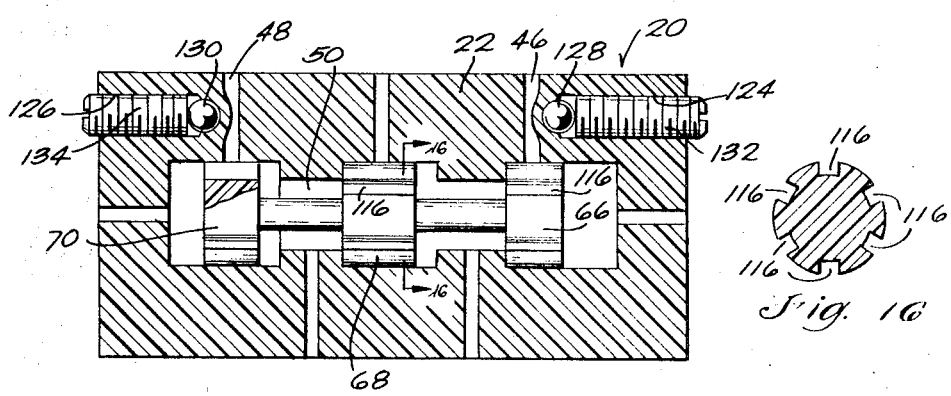
Fig. 15
Fig. 16
Inventor
Gerald T. Sorenson
By Lieber & Nilles
Attorneys Inventor
Gerald T. Sorenson By Lieber & Niller
Attorneys Inventor
Gerald T. Sorenson
By Lieber & Niller
Attorneys

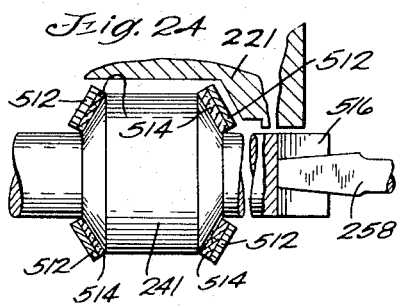
Fig. 24
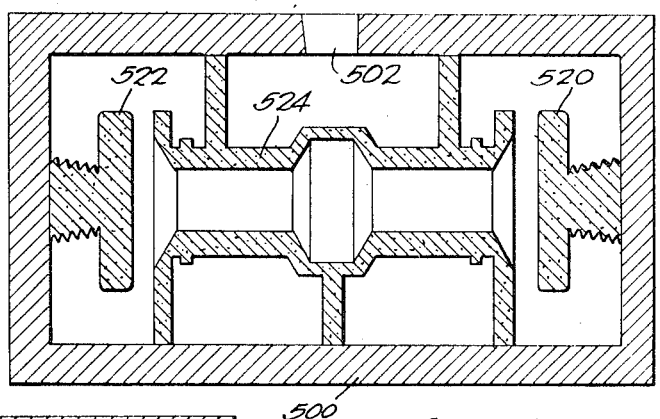
Fig. 25a
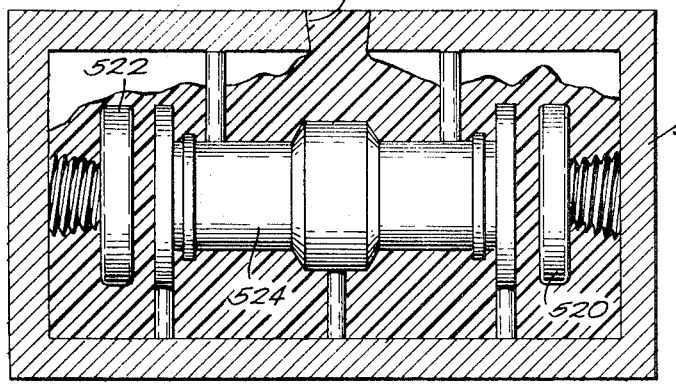
Fig. 25b
Fig. 25c
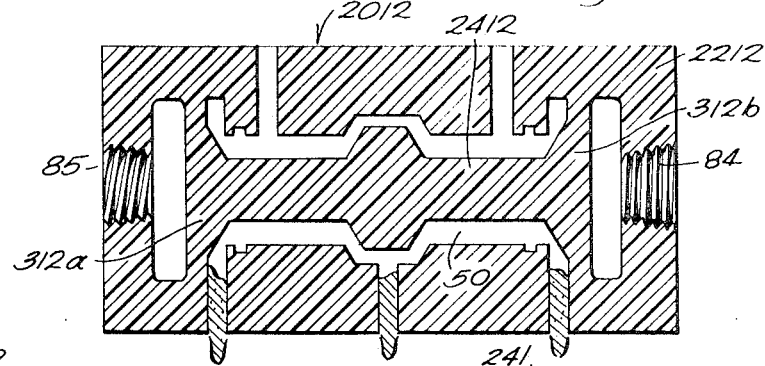
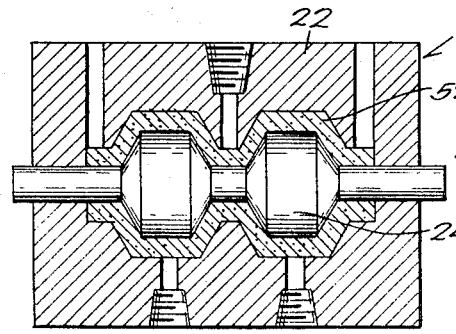
Fig. 25d
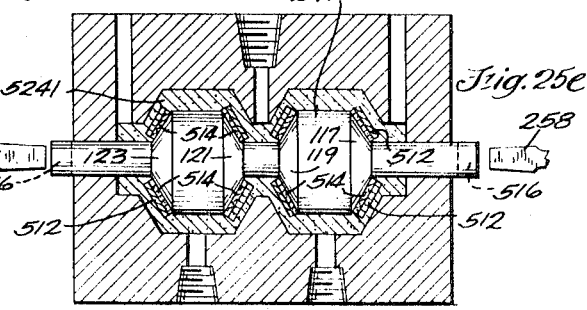
Fig. 25e
Inventor
Gerald T. Sorenson
By Lieber & Nilles
Attorneys

METHOD OF MANUFACTURING A PRESSURIZED FLUID CONTROL VALVE

BACKGROUND OF THE INVENTION

1. Field of the Invention

The present invention relates to fluid control valves of the reciprocating type.

2. Description of the Prior Art

The most commonly used valves for the directional control of pressurized fluids are the spool valve and the poppet valve.

In the former, the valve body contains a bore having a plurality of cylindrical valve sealing surfaces axially spaced along it. The valve spool includes a plurality of cylindrical collars which selectively mate with the valve-sealing surfaces of the body as the valve spool is axially moved in the bore so as to control the flow of the pressurized fluid through the bore and the inlet and outlet ports of the valve. The valve-sealing surfaces often incorporate a sealing means, such as an O-ring, to improve the seal with the collars of the valve spool.

A salient characteristic of the spool valve is that in any position there is a balancing of the axial forces applied by the pressurized fluid flowing through the valve so that there is no net axial force tending to move the spool in any given direction. This allows the spool to be shifted from one position to another, so as to selectively mate different valve-sealing surfaces and collars, with a small amount of axial force.

WHile it might be expected that this would increase the speed of response of the valve, the relatively large axial movement required to shift the collars between adjacent valve-sealing surfaces results in a rather slow speed of response unless the valve spool is moved at high accelerations and velocities. This, however, causes undesirable wear and tear on the valve elements. Further, the sealing means in the valve tend to deteriorate resulting in leakage and other malfunctions. Foreign material has a tendency to jam the spool and prevent proper operation. The large number of parts incorporated in such a valve has tended to make the manufacture of spool valves expensive and time consuming.

The poppet valve also includes a body having a bore. The bore includes annular valve seats at either end thereof. An axially movable member, generally called a spool, includes a pair of surfaces which coact with one or the other of the annular valve seats at a time so as to direct the pressurized fluid entering the bore in the center thereof out outlet ports located at one or the other end of the valve body.

The poppet valve is characterized by fast response due to the short actuating distance required to open and close the outlet ports at the ends of the bore. Poppet valves feature a high-flow capacity, good sealing action, and the ability to tolerate a considerable amount of foreign material in the pressurized fluid before malfunctioning.

However, there are several disadvantages in presently available poppet valves. There is an unbalanced force on the spool when the poppet valve is pressurized and considerable force is required to shift the spool from one flow condition to another. This often requires large poppet valves be shifted with a pilot valve, usually a smaller solenoid operated valve. Four way poppet valves, commonly used for energizing hydraulic or pneumatic cylinders, are extremely complicated in construction and operation. Poppet valves, like spool valves, also include a large number of parts which complicate the manufacture of such valves.

Summary of the Present Invention

It is, therefore, an object of the present invention to provide an improved control valve which has the advantageous features of both the spool-type of valve and the poppet-type of valve, but has none of the disadvantages of either of such valves and which further has unique features that are not obtainable in presently available fluid control valves. The present invention also provides a simple expeditious method of manufacturing such a valve.

It is a further object of the present invention to provide an improved fluid control valve in which at least one of the two members comprising the valve is constructed of a resilient material capable of being deformed and possessing inherent recovery properties. The use of such materials also provides a simple, expeditious method of manufacturing such a valve.

More specifically, the present invention provides a valve for controlling the flow of pressurized fluid including a valve body having a plurality of fluid entrance and emission ports opening into a common confined elongated cavity. A valve spool is held captive in said cavity and is longitudinally movable therein. The cavity contains longitudinally spaced, inwardly projecting wall portions forming at least a pair of valve seats along their sides. The valve spool has at least a pair of collars suitable for coaction with the valve seats which are positioned on the valve spool so as to permit the valve spool to be moved to a longitudinal position wherein the collars simultaneously coact with the valve seats to control the flow of fluid selectively through the ports and cavity.

The present invention also provides a unique method for making such a valve which comprises the steps of providing a unitary valve body having a plurality of fluid entrance and emission ports opening into a common confined cavity, providing a unitary valve spool insertable into the common confined cavity of the valve body, inserting the valve spool in the cavity by deforming either the body or spool, and permitting the deformed member to return to its normal recovered state. Brief Description of the Drawing FIG. 1 is a sectional view of a valve constructed in accordance with the present invention and showing the valve in one pressurized fluid control position;

FIG. 4 is a sectional view of a valve of the type shown in FIG. 2 modified so that the forces applied to the valve spool by the pressurized fluid tend to urge the valve spool into its present position;

FIG. 5 is a free body diagram of the valve spool incorporated in the valve of FIG. 4;

FIG. 6 is a sectional view of a valve of the type shown in FIG. 2 modified so that the forces applied to the valve spool by the pressurized fluid tend to urge the valve spool out of its present position;

FIG. 7 is a free body diagram of the valve spool incorporated in the valve of FIG. 6;

FIG. 8 is a sectional view of a valve of the type shown in FIG. 2 modified so that the forces applied to the valve spool by the pressurized fluid tend to exert no net resultant force on the valve spool;

FIG. 9 is a free body diagram of the valve spool incorporated in the valve of FIG. 8;

FIG. 10 is a sectional view of a valve of the type shown in FIG. 1 modified so that the forces applied to the valve spool by the pressurized fluid tend to exert no net resultant force on the valve spool;

FIG. 11 is a sectional view of a valve of the type shown in FIG. 1 modified so that the forces applied to the valve spool by the pressurized fluid tend to exert no net resultant force on the valve spool, the Figure also showing a means for conveniently attaching the fluid conduits to the valve;

FIG. 12 is a sectional view of a valve of the type shown in FIG. 1 modified so that the forces applied to the valve spool by the pressurized fluid tend to urge the valve spool out of its present position;

FIG. 13 is a sectional view of a valve of the type shown in FIG. 1 modified so that the forces applied to the valve spool by the pressurized fluid tend to urge the valve spool into its present position;

FIG. 15 is a sectional view of another embodiment of the valve of FIG. 1, the embodiment of the Figure also incorporating a flow control means;

FIG. 16 is a cross sectional view of the valve shown in FIG. 15 taken along the line 16—16 of the latter Figure;

FIG. 17 is a sectional view of a pilot-operated valve of the type shown in FIG. 1 modified so as to prevent leakage of the pressurized fluid of the pilot into the valve; the Figure also showing an alteration in the valve body of the valve;

FIG. 19 is a sectional view of a modification of the valve shown in FIG. 2 which permits the valve to control fluid pressurized at less than ambient pressure;

Figure 1:
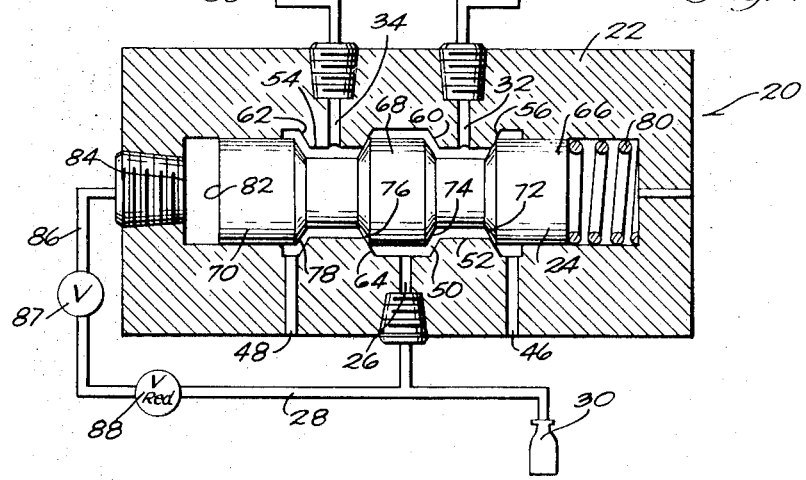
FIG. 1a is a sectional view of the valve of FIG. 1 showing the valve in the other pressurized fluid control position.
Figure 21A:
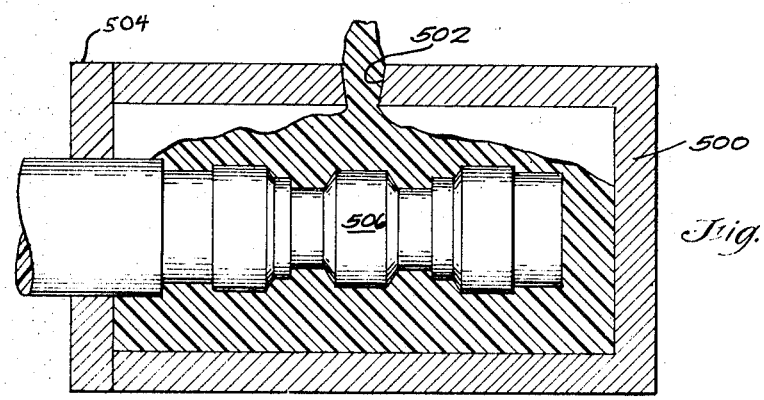
Figure 21B:
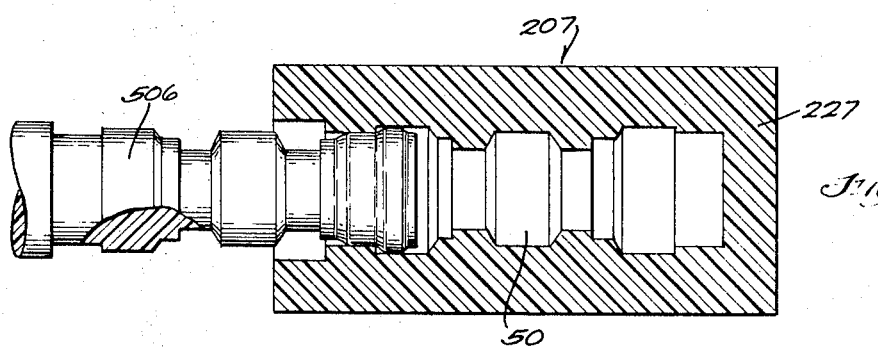
Figure 21C:
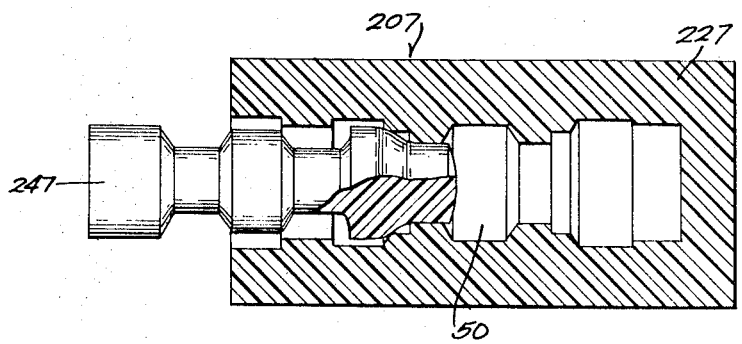
Figure 22A:
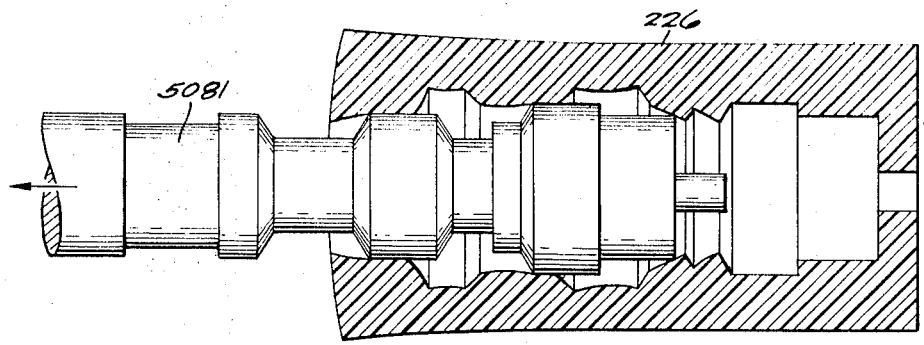
Figure 22B:
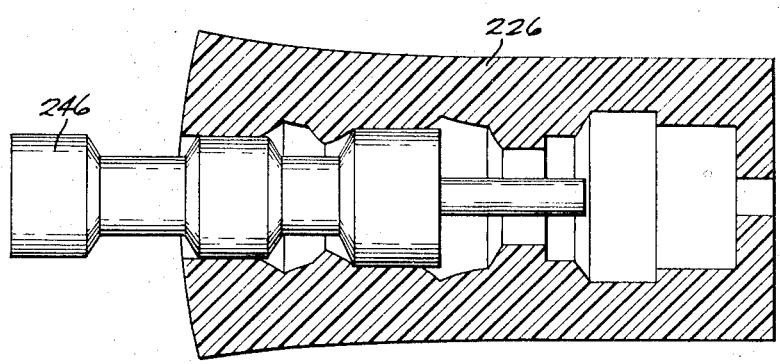
Figure 23:
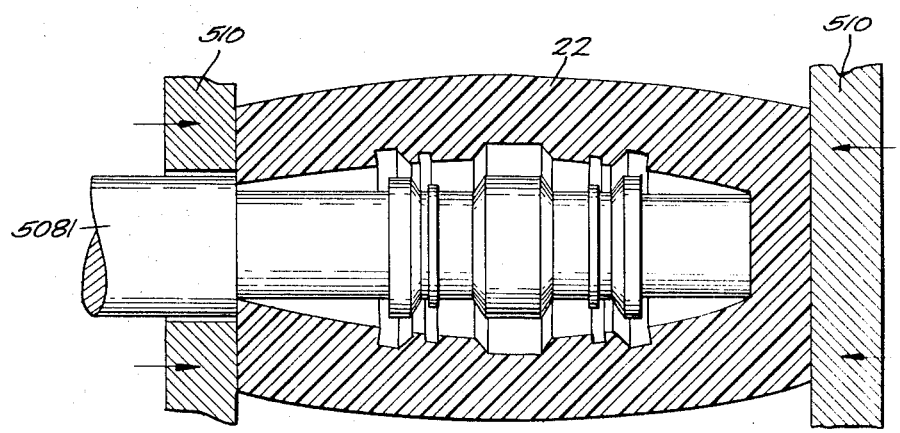

FIGS. 1, 2, 4, 6, 8, 10, 11, 12 and 13 also show various means for actuating the valve of the present invention;

FIGS. 6, 8, 10, 12, 15 and 20 also show, by appropriate symbols, various materials from which the valve of the present invention may be constructed;

FIGS. 21a, 21b and 21c show the steps in a method for manufacturing the valve of the present invention;

FIGS. 22a and 22b show the steps in another method for manufacturing the valve of the present invention;

FIG. 23 shows an alternative step in the manufacturing method shown in FIG. 22;

FIG. 24 shows an additional step in the methods of manufacturing the valve of the present invention; and FIGS. 25a, 25b, 25c, 25d and 25e show the investment casting method of manufacturing the valve of the present invention. Description of the Preferred Embodiments Referring now to the Figures, FIG. 1 shows a valve for controlling the flow of pressurized fluid constructed in accordance with the present invention. The term pressurized fluid as used herein is to be understood as including fluids under any pressure, without regard to atmospheric or other ambient pressure. Such conditions may include those commonly thought of as vacuum conditions. The valve is indicated generally by the numeral 20 and is comprised of a valve body 22 and a valve spool 24.

The valve body 22 contains a plurality of fluid entrance and emission ports. Specifically, valve body 22 may contain fluid entrance port 26 which is connected, via conduit 28, to a source of pressurized fluid, shown diagrammatically as air bottle 30. Fluid emission ports 32 and 34 are connected, via conduits 36 and 38 respectively, to cylinder 40 so that when fluid is supplied to cylinder 40 from emission port 32, piston 42 and piston rod 44 of cylinder 40 are retracted. When fluid is supplied to cylinder 40 from emission port 34, piston 42 and piston rod 44 are extended. The fluid ports may be provided with the appropriate connectors for the conduits. To prevent the buildup of back pressures in valve 20 and cylinder 40, exhaust emission ports 46 and 48 are provided in valve body 22.

The aforementioned entrance and emission ports open into a common elongated cavity 50 confined within valve body 22. Cavity 50 may be cylindrical in shape with the ports located longitudinally or axially along the circumference of the cavity. Valve spool 24 is held captive in cavity 50 and is movable within the cavity to control the flow of fluid selectively through the ports and cavity.

Specifically, cavity 50 includes axially spaced wall portions 52 and 54 of reduced diameter which project inwardly toward the center of cavity 50 to form valve seats along the sides thereof. For example, wall portion 52 includes inclined side surface 56 which forms such a valve seat. Side surface 56 is annular or ringlike, such terms being used in their geometric sense as defining the space or area between two concentric circles. Such terms as used herein do not define a portion of a cylinder such as that formed by the end wall portion 52. Portion 52 also includes inclined annular surface 60 which forms a second valve seat on the axially spaced wall portion. Emission port 32 opens into cavity 50 along portion 52, axially between annular surfaces 56 and 60.

Axially spaced wall portion 54 includes inclined annular surfaces 62 and 64 which form valve seats in the same manner as surfaces 56 and 60 of wall portion 52. Emission port 34 opens into cavity 50 along axially spaced portion 54.

Exhaust emission ports 46 and 48 open into cavity 50 between the ends of the cavity and axially spaced wall portions 52 and 54. Fluid entrance port 26 opens into cavity 50 in the center of the cavity between axially spaced wall portions 52 and 54.

Valve spool 24 is cylindrical in shape so as to be movable within the cavity 50. Valve spool 24 includes collars 66, 68 and 70 of increased diameter, which coact with the valve seats 56, 60, 62 and 64 formed by axially spaced wall portions 52 and 54. Specifically, collar 66 on one end of valve spool 24 includes annular surface 72 which coacts with valve seat 56 of portion 52, in the manner shown in FIG. 1, to form a seal along the valve seat 56. Collar 68 contains inclined annular surfaces 74 and 76 which coact with valve seats 60 and 64, respectively, of axially spaced portions 52 and 54. FIG. 1 shows annular surface 76 coacting with valve seat 64 to form a seal along the valve seat. Collar 70 contains inclined annular surface 78 which coacts with valve seat 62 of portion 54.

An actuating means is provided to axially move valve spool 24 in cavity 50 to control the flow of fluid through the entrance and emission ports and cavity 50. As exemplarily shown in FIG. 1, such actuating means may consist of spring 80 contained in the end portion of cavity 50 extending beyond valve spool 24. Spring 80 urges valve spool 24 in a direction of movement away from the spring and toward the other end of cavity 50.

Valve 20 also includes an actuating means operating in opposition to spring 80 which urges valve spool 24 in a direction of movement toward spring 80. Such a means may comprise the aforementioned collar 70 of valve spool 24 which fits snugly within the end portion of cavity 50 extending beyond valve spool 24. Collar 70 has an exposed face 82. Cavity 50 is provided with a pilot port 84 in the end portion containing collar 70. Pilot port 84 is connected to the source of pressurized fluid through conduit 86, valve 87, and reducing valve 88.

Spring 80 normally urges valve spool 24 into the position in cavity 50 shown in FIG. 1. With valve spool 24 in such a position, annular surface 76 of collar 68 coacts with valve seat 64 of axially spaced wall portion 54 and forms a seal along the seat. In a similar manner, annular surface 72 of collar 66 coacts with valve seat 56 to form a seal. It is to be noted that collar 66 and 68 are so positioned on valve spool 24 as to permit the above designated pair of surfaces to simultaneously coact.

In operation, as the pressurized fluid from bottle 30 flows through conduit 28 and entrance port 26 into valve body 22, it is contained in the portion of cavity 50 defined by the seals formed along the aforementioned pair of valve seats and thus flows out of cavity 50 through emission port 32. The pressurized fluid passes from emission port 32 through conduit 36 into cylinder 40 to retract piston 42 and piston rod 44. The pressurized fluid behind piston 42 flows through conduit 38, emission port 34, the portion of cavity 50 to the left of coacting annular surface 76 and valve seat 64, and out exhaust port 48. For purposes of explanation, valve spool 24, when in the position shown in FIG. 1, may be termed to be in the left-hand fluid control position.

Should any of the pressurized fluid leak past the seal formed by the coacting annular surface 76 and valve seat 64, it is discharged through exhaust emission port 48 into the atmosphere so as not to flow through emission port 34 and conduit 38 and build up a back pressure in cylinder 40. Leakage of the pressurized fluid past the seal formed by the coaction of annular surface 72 and valve seat 56 is discharged through exhaust port 46.

Figure 1A:
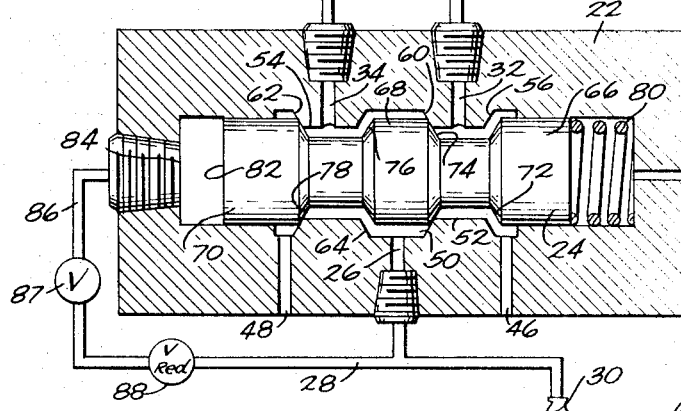

To open emission port 34 and close emission port 32, valve 87 is opened to permit pressurized fluid to enter pilot port 84 in the end portion of cavity 50. Such pressurized fluid, when applied to face 82 of valve spool 24, moves valve spool 24, against the urging of spring 80, to a position in which annular surfaces 74 and 78 of spool 24 simultaneously coact or abut valve seats 60 and 62, respectively, of axially spaced wall portions 52 and 54. See FIG. 1A. This stops the flow of the pressurized fluid from entrance port 26 out emission port 32 and commences the flow of pressurized fluid out emission port 34. The fluid from emission port 34 flows through conduit 38 into cylinder 40 and extends piston 42 and piston rod 44. Any fluid discharged from cylinder 40 by extension of piston 42 passes from conduit 36 and emission port 32 through cavity 50 and out exhaust emission port 46. When valve spool 24 is in the position shown in FIG. 1A, it may hereinafter be termed to be in the right hand fluid control position.

It will be appreciated that the relative configuration of valve body 22 and valve spool 24 may be reversed so that valve body 221 has three axially spaced wall portions having side surfaces forming valve seats and valve spool 241 has only two flanges 105 and 107 with annular surfaces. See valve 201 in FIG. 2. Specifically, wall portion 103 includes annular surface 109 forming a valve seat. Wall portion 102 includes annular surfaces 111 and 113 forming valve seats while wall portion 101 includes annular surface 115.

Collar 105 on valve spool 241 has annular surfaces 117 and 119 which coact with valve seats 115 and 113, respectively. Collar 107 has annular surfaces 121 and 123 which coact with valve seats 111 and 109, respectively.

Figure 2:
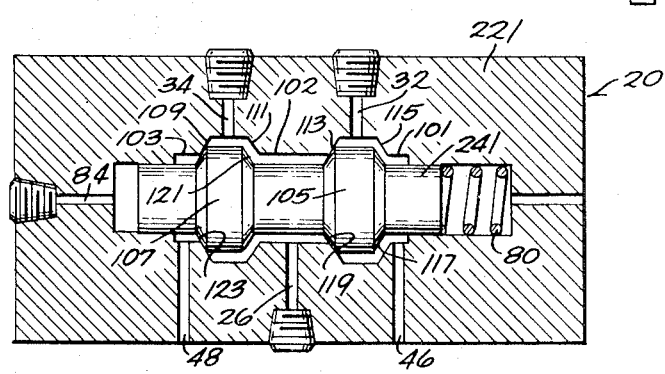
FIG. 2 is a sectional view of another embodiment of a valve constructed in accordance with the present invention.

The operation of valve 201 is the same as valve 20 shown in FIG. 1, the valve spool being biased into the position shown in FIG. 2 by spring 80 and moved in opposition to spring 80 by pressurized fluid admitted through pilot port 84.

In either of the basic embodiments of the valve of the present invention, only a small amount of axial movement of valve spool 24 or 241 is required to open emission port 32 and close emission port 34 or vice versa. The valve provides a large fluid flow capacity in spite of this short axial movement because the circumferential flow pattern in cavity 50. Also, no sliding seals are involved in directing or controlling the flow of pressurized fluid through valve 20.

Figure 3:
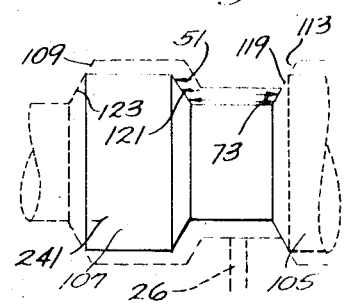
FIG. 3 is a free body diagram of a portion of the valve spool incorporated in the valve of FIG. 2 showing the forces applied to the valve spool by the pressurized fluid.

In the valves shown in FIGS. 1 and 2 the pressure of the fluid flowing through the valve tends to aid the sealing action along the valve seats. This may be seen most clearly by a free body diagram of the portion of valve spool 24 between the two valve seats along which sealing simultaneous occurs. See FIG. 3 which shows a free body diagram of the portion of valve spool 241 delineated by annular surfaces 109 and 113 in FIG. 2. The forces exerted on this free body by the pressurized fluid flowing through valve cavity 50 are shown by the small arrows. The forces exerted on annular surface 121, designated by arrows 51, tending to move valve spool 241 to the left are greater than the forces exerted on the portion of annular surface 119 exposed to cavity 50, designated by the arrows 73, tending to move valve spool 241 to the right, due to the greater exposed area on annular surface 121 than on annular surface 119.

As a result, the force of the fluid flowing through cavity 50 on valve spool 241 tends to force annular surface 123 into abutment with valve seat 109 and annular surface 119 into abutment with valve seat 113 so as to increase the sealing action along those seats.

While this is in general a desirable condition, it may in certain circumstances, be undesirable since the pressurized fluid in pilot port 84 must overcome both the force generated by the fluid and the force of spring 80 in order to axially shift valve spool 241 to the right hand fluid control position. It is a feature of the pressurized fluid control valve of the present invention that, by varying the construction of the valve body and spool, the forces generated by the pressurized fluid on the valve spool may be neutralized so as to have no net effect thereon, or may be applied to the spool se as to tend to seat or unseat the valve spool Such variations in the net effect of the forces generated by the pressurized fluid on the valve spool is obtained by the inclusion of the two or more annular surfaces on the valve spool which are simultaneously exposed to the pressurized fluid in valve cavity 50 when the valve spool is in either of the fluid control positions. As shown in the free body diagram of FIG. 3, the forces applied by the pressurized fluid on the annular surfaces oppose each other so that by varying the area of one or the other of the annular surfaces, the total force applied to that surface and hence the net resultant force on the valve spool, may be varied.

Consider first, a valve so constructed that the forces generated by the pressurized fluid on the valve spool have no net effect on the valve spool. The valve spool may be termed "balanced" and may be axially shifted with only a small amount of actuating force on the valve spool. As such, valve 204 is ideally suited for actuation by solenoid 180, the armature 182 of which may be connected to, or integral with, valve spool 244 for movement when coil 184 is energized. See FIG. 8 which shows a valve of the type shown in FIG. 2.

To provide such balanced action to valve 204, flanges 148 and 150 of increased size are provided on collars 105 and 107 of valve spool 244. These flanges coact with valve seats 113 and 111, respectively. Central wall portion 102 of valve body 224 is cut away so as to be of a greater diameter than wall portions 101 and 103 and equal in diameter to the diameter of collars 105 and 107. This exposes more of annular surfaces 119 and 121 when those surfaces coact with valve seats 113 and 111, respectively. The effect of the flanges 148 and 150 of collars 105 and 107, and the cutting away of central wall portion 102 may be more fully appreciated by reference to FIG. 9. As shown in the free-body diagram of that figure, the sum of the force on surface 121, designated by the arrows 152, plus the force on the right or back side of enlarged flange 148, also designated by arrows 152, exactly equals the force on surface 119, designated by arrows 154, so that there is no net effect on the valve spool due to the flow of pressurized fluid through cavity 50 when valve spool 244 is in the right-hand fluid control position, shown in FIG. 8, or in the left-hand fluid control position.

Solenoid 180 may move valve spool 244 without having to overcome any forces applied thereto by the pressurized fluid in valve cavity 50, increasing the speed of response of valve 204 and reducing the energizing current required in the solenoid 180 to move valve spool 244. Because of the balanced valve spool 244, a larger axial displacement of valve spool 244, and an increased flow rate to valve 204, may be provided, even though the force exerted by a solenoid generally decreases rapidly as the armature is extended.

To balance a valve of the embodiment of FIG. 1, portions 156 of axially spaced wall portions 52 and 54 are cut away to expose greater areas of annular surfaces 72 and 78 when those surfaces coact with valve seats 56 and 62, respectively. See FIG. 10. Collars 66 and 70 of valve spool 247 may be increased in size to insure such coaction. The remainder of valve spool 247 and valve body 227 may remain unchanged.

By making the size of the cutaway portions 156 of the axially spaced wall portions such that the amounts of annular surfaces 72 and 78 exposed when the surfaces coact with valve seats 56 and 62 equal the areas of annular surfaces 74 and 76, the effect of the forces generated by the pressurized fluid in cavity 50 is neutralized so as to balance the valve spool.

If it is not desired to cut away a portion of the axially spaced wall portions, a groove 157 may be placed in each of the wall portions adjacent annular valve seat surfaces 56 and 62 as shown in FIG. 11. Such groves form flexible lips of the annular valve seat surfaces which, in addition to aiding in the sealing along the valve seats and reducing the tolerances required in the positioning of collars 66, 68 and 70 on the valve spool, assist in balancing the valve spool through the force exerted on the walls of the grooves adjacent valve seats 56 and 62 by the pressurized fluid in the groove.

In valve 203 shown in FIG. 6, the pressurized fluid in cavity 50 exerts an unbalanced force on the valve spool which tends to unlock or urge the valve spool out of a selected one of its fluid control positions into the other fluid control position. Such a valve 203 may utilize a single pushbutton 142 to provide axial movement to valve spool 243 to move it to the fluid control position shown in FIG. 6 when the pushbutton is pushed. The valve spool remains in this position only as long as the pushbutton is pushed. When the pushbutton is released, valve spool 243 reverts to the other fluid control position under the urging of the forces applied through the valve spool by the pressurized fluid passing through valve cavity 50.

To provide such action to valve 203, a flange 144 of increased size is provided on collar 105 and positioned so as to abut annular valve seat 113 when valve spool 243 is in the left-hand fluid control position. Collar 107 is enlarged and abuts valve seat 111. Central wall portion 102 containing valve seat 111 is cut away so as to be of increased diameter.

FIG. 7 shows a free-body diagram of valve spool 243 in the right-hand fluid control position of FIG. 6. The forces exerted on this free-body by the pressurized fluid flowing through valve cavity 50 are again shown by small arrows. The force exerted on the portion of annular surface 121 exposed to cavity 50, designated by arrows 146, plus the force exerted on the back or right side of enlarged portion 144, also designated by arrows 146, is greater than the force exerted on annular surface 119, designated by arrows 148, so that the net applied force tends to move valve spool 243 to the left-hand fluid control position when pushbutton 142 is released. As valve spool 243 leaves the right-hand fluid control position, the forces on the valve spool become balanced as all surfaces of the valve spool are exposed to the pressurized fluid. Valve spool 243 may be assisted to the left-hand fluid control position by spring 80. Valve spool 243 is retained in the left-hand position by the excess of the forces executed on annular surface 121 over the forces exerted on annular surface 119 when the valve spool 243 is in the left-hand fluid control position.

A single pushbutton actuated valve which reverts to one fluid control position whenever the pushbutton is released is also shown in FIG. 12. This valve 206 is of the type shown in FIG. 1. A portion 156 of axially spaced wall portion is cut away to expose a greater area of annular surface 72 when that surface coacts with valve seat 56. Collar 66 of valve spool 246 may be increased in size to insure such coaction. The remainder of valve spool 246 and valve body 226 may remain unchanged.

It will be apparent that the pressurized fluid in cavity 50 exerts a force on valve spool 246 tending to move the spool to the right and into the right-hand fluid control position. The valve spool may be moved to the left-hand fluid control position by pressing pushbutton 158, but returns to the right-hand position as soon as the pushbutton is released. No spring or other return means is required in valve 206 because of the increased area of surface 72 exposed to the fluid in cavity 50.

FIG. 4 shows a valve 202 in which the forces exerted by the pressurized fluid exert a strong force on the valve spool which tends to urge or lock the valve spool in whichever of its two positions it is presently in. Valve 202 of FIG. 4 is shown as a double pushbutton valve operated by pushbuttons 130 and 132 extending through the pilot ports at either end of valve body 222. The operation of valve 202 is such that when one of the pushbuttons, for example pushbutton 132, is pushed to provide axial movement to the valve spool and control to the pressurized fluid passing through cavity 50, the valve spool remains in the position into which it is urged by the pushbutton even though the pushbutton is subsequently released. Such a valve may be said to "latch." The valve spool may be moved out of latched position only by pressing the other pushbutton, for example, pushbutton 130, so as to axially move the valve spool in the other direction into the other pressurized fluid control position. The valve will also latch in this position. Pushbutton 132 may be pulled to move the valve spool to the other fluid control position.

Collars 105 and 107 of valve spool 242 contain flanges 134 and 136 of increased diameter. These flanges coact with valve seats 115 and 109. The effect of flanges of collars 105 and 107 may be more fully appreciated by reference to FIG. 5 which shows a free-body diagram of the portion of valve spool 242 delineated by annular surfaces 111 and 115. The force exerted on annular surface 119, plus the forces exerted on flange 134, both designated by arrows 138 and tending to move valve spool to the right, are considerably greater than the forces exerted on the portion of annular surface 121 exposed to cavity 50, designated by arrows 140 and tending to move valve spool 242 to the left. Thus valve spool 242 is urged into the right-hand position shown in FIG. 4.

The valve will latch in the left-hand fluid control position due to excess of the force generated by the pressurized fluid on annular surface 121 and collar 136 over the force generated by the pressurized fluid on annular surface 119 when the valve spool is in the latter position. In either position, the force on valve spool 242 is greater than the sealing force on valve spool 241 shown in FIG. 3.

To form a latching valve of the type shown in FIG. 1, rims 159 are added to the axially spaced wall portions 52 and 54. The fluid forces on cavity 50 may thus be made to urge valve spool 248 into its presently seated position so as to latch the valve spool 248 and prevent dislodgement except by an oppositely applied axial force. See FIG. 13.

As may be noted from the drawings, numerous means may be employed to actuate the valve of the present invention. In addition to the solenoid, pushbutton and other means described above, a pilot valve similar in construction to valve 20 may be utilized. See FIG. 11 which shows pilot valve 306 for operating valve 209 by providing pressurized fluid in one or the other of the pilot ports 84 or 85 at the ends of the valve. Pilot valve 306 may be actuated by low pressure pressurized fluid in bottle 301 so that the valve, in effect, becomes an amplifier by permitting the low pressure fluid in bottle 301 to control the flow of the pressurized fluid from bottle 30 through valve 209. Pilot valve 306 may be integrally mounted in the same valve body as valve 209 as shown in FIG. 11, if desired.

Numerous means are available to separate the controlling pressurized fluid from bottle 301 from the controlled pressurized fluid in cavity 50. Seals, such as the chevron-type seal 310 shown in FIG. 11, in the collars of the valve spool may be utilized.

A diaphragm, such as diaphragm 312, shown in FIG. 17, may be placed across the exposed face 82 of the collars on valve spool 2411. In valves in which the valve spool is fabricated out of resilient material, as hereinafter described, diaphragm 312 may be formed as a part of the valve spool, also as shown in FIG. 17.

In valve 209 of FIG. 11, the coaction of annular surface 72 with valve seat 56 tends to form a seal in cavity 50 when valve spool 249 is in the left-hand fluid control position. The coaction of annular surface 78 with valve seat 62 forms a seal in cavity 50 when valve spool 249 is in the right-hand fluid control position. Any controlling pressurized fluid which does leak past seal 310 and the coacting surfaces is discharged through the adjacent emission port 46 or 48.

Figure 14:
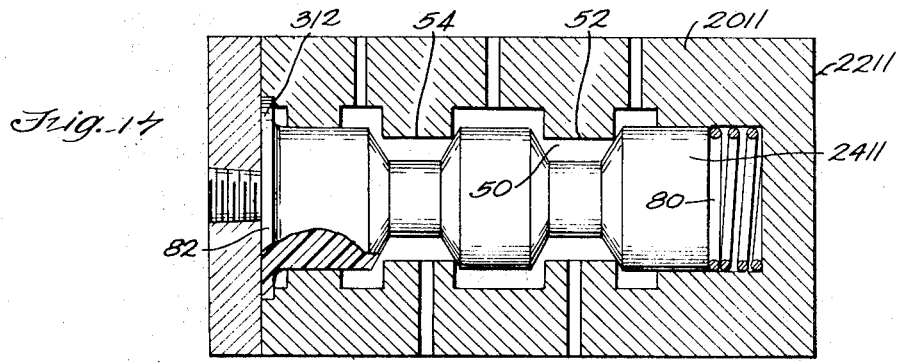
FIG. 14 is a sectional view of a pilot-operated valve of the type shown in FIG. 2 modified so as to prevent leakage of the pressurized fluid of the pilot into the valve.

In valves having the valve spool configuration of FIG. 2, an additional collar may be added to each end of the spool to form seals in cavity 50. Specifically, as shown in FIG. 14, collars 104 and 106 are added to the end of valve spool 2410. Collar 104 includes annular surface 108 which coacts with valve seat 110 on axially spaced wall portion 101. Collar 106 includes annular surface 112 which coacts with valve seat 114 on axially spaced wall portion 103.

When valve spool 2410 is moved to the left-hand fluid control position as shown in FIG. 14, be pressurized fluid entering pilot port 85, annular surface 108 coacts with valve seat 110 to seal the remainder of cavity 50 from the fluid in pilot port 85. When valve spool 2410 is moved to the right-hand fluid control position cavity 50 is sealed by the coaction of annular surface 112 and valve seat 114.

Various other modifications may be made to the valve body and spool of the valve of the present invention. For example, as shown in FIG. 15, the annular surfaces forming the valve seats of valve 20 need not be inclined but rather may be abutting surfaces lying perpendicular to the axis of the valve 20 and cavity 50.

Also as shown in FIG. 15, the collars 66, 68, and 70 on the valve spool may extend to the walls of cavity 50. Longitudinal grooves 116 are provided in the collars to permit fluid flow in cavity 50. See FIG. 16.

A valve spool 2411 having inclined annular surfaces may be employed in a valve body 2211 having perpendicular annular valve seats, so that the annular surfaces make contact and seal along a line. See FIG. 17. It will be appreciated that in such a valve, the valve spool is inherently balanced with respect to the forces generated by the pressurized fluid in valve cavity 50. Due to the small area along the lines of contact of valve body 2211 and valve spool 2411, a high stress is developed which tends to aid the sealing along the valve seat.

Figure 18:
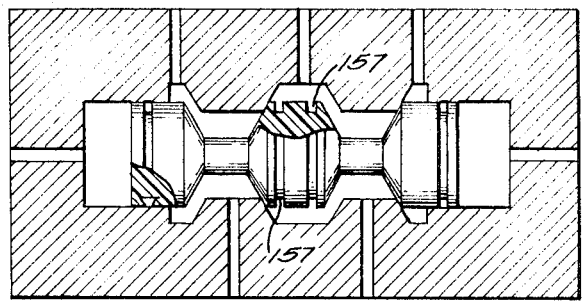
FIG. 18 is a sectional view of a modification of the valve shown in FIG. 11.

As shown in FIG. 18, grooves 157 which aid in the sealing along the valve seats may be placed in the valve spool rather than in the valve body. By reversing the position of such grooves on the valve spool as shown in FIG. 19, a valve suitable for use with pressures below atmospheric or ambient may be provided. Such a valve may control the application of a vacuum applied to port 120, normally the fluid entrance port, by directing the vacuum to either of two control ports 122 or 124.

The features and advantages of the valves described above are abetted by constructing either the valve spool or the valve body so as to include at least portions thereof which are capable of being deformed during assembly of the valve and which possess inherent recovery properties so that after assembly of the valve they return to either original condition. The valves of the present invention may thus be formed of but two parts in contrast to the numerous parts of presently available spool and poppet valves.

Such deformable or resilient materials may typically include polyurethane, neoprene, polyethylene, or rubber.

FIG. 10 shows a valve in which valve body 227 is constructed of a nonresilient, rigid, or unyielding material, such as aluminum or cured epoxy or polyester resin, while valve spool 247 is formed of resilient material. Valve spool 247 is deformed while being inserted in valve body 227 but recovers after insertion to the condition shown in FIG. 10.

FIG. 12 shows a valve in which valve body 226 is constructed of resilient or elastic material which is deformed during the insertion of metal valve spool 246 and which recovers to its original condition after assembly of the valve.

It may be noted in passing that the force required to deform the valve body or spool during assembly of the valve is far greater than the forces on the body and spool during operation of the valve so that disassembly of the valve cannot occur during normal operation.

FIG. 8 shows a valve in which only the collars 105 and 107 of valve spool 244 are formed of resilient material. The shaft 2441 of valve spool 244 may be formed of a ferromagnetic material so that the valve finds particular utility as a solenoid-operated valve. Collars 105 and 107 may be retained on the shaft of valve spool 244 by mating tongues and and grooves or other appropriate means.

FIG. 6 shows a valve in which axially spaced wall portions 101, 102, and 103 are formed of resilient material with the outer shell 2031 of valve body 223 and valve spool 243 being formed of a rigid material.

Figure 20:
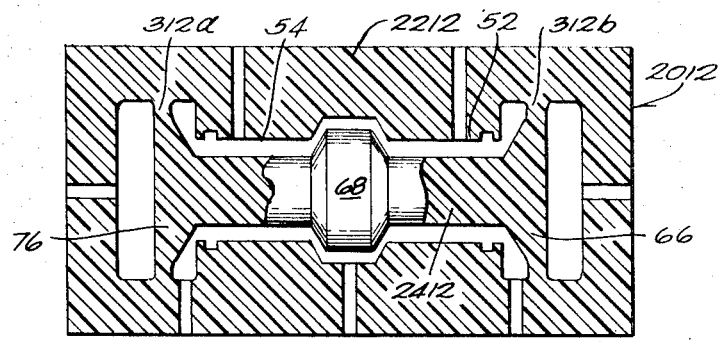
FIG. 20 is a sectional view of a modification of the valve shown in FIG. 1 wherein the parts of the valve are integrally formed into a unitary structure.

In instances in which valve body 22 and valve spool 24 are both formed of resilient material, diaphragms 312, along with valve body 22 and valve spool 24, may be integrally formed of a single piece of resilient material, as shown in FIG. 20. The diaphragms 312a 312b are joined to both valve body 2212 and valve spool 2412 and form elements common to both members so that a unitary structure results. Such a unitary structure insures separation of the controlling pressurized fluid from the controlled pressurized fluid. The valve 2012 may be constructed by the lost wax or investment-casting process.

The use of resilient material in forming either or both of the valve body 22 and valve spool 24 provides numerous other advantages to valve 20. For example, the volume of pressurized fluid flowing through the ports of the valve may be controlled by the flow control means shown in FIG. 15 and integrally formed in valve 20. The flow control means resiliently deforms the ports so as to partially or completely obstruct them. For this purpose, threaded holes 124 and 126 are provided in resilient valve body 22 adjacent to the ports, such as exhaust ports 46 and 48. By controlling the flow of the pressurized fluid through the exhaust ports the rate of extension or retraction of the piston in a fluid-operated cylinder, such as cylinder 40, connected to the control ports of the valve may be regulated. The holes are drilled to a depth such that a thin wall of elastic material is provided between the bottom of holes 124 and 126 and the ports 46 and 48. Balls 128 and 130, or other means for smoothly deforming the wall so formed, are placed in the holes and a set screw, 132 and 134, or other retaining means threaded into the exposed opening of each of the holes.

By rotating setscrews 132 and 134 so as to insert the setscrews further into holes 124 and 126, balls 128 and 130 are pressed against the bottom of holes 124 and 126 so as to form bulges in the walls of ports 46 and 48 which obstruct the flow of pressurized fluid through the ports. The size of the bulges, and hence the amount of obstruction to the ports, may be varied by altering the position of setscrews 132 and 134 in holes 124 and 126.

The actuating means and other associated apparatus for valve 20 may also be integrally formed in the valve during the manufacture thereof. For example, actuating means, such as solenoid 180, may be encapsulated in the valve body material, such as epoxy resin or polyurethane, thereby eliminating external connections of the valve to the actuating means. See FIG. 10.

A means for depressing or pushing the pushbutton of a pushbutton operated valve, such as valve 206 of FIG. 12, may also be incorporated in the valve. Resilient arm 300 having roller 302 on the end thereof is mounted on an end of valve body 206 so as to bear on pushbutton 158. When arm 300 is bent toward valve body 206, as shown in FIG. 12 by cam or other means engaging roller 302, pushbutton 158 is depressed and axial movement provided to valve spool 246.

The use of the elastic material for valve body 22 lends itself well to the use of easily removable, or "snap-in" attachments to the valve 20.

For example, conduits 26, 36, 38 and 86 may be affixed to valve 20 in the easily removable manner, shown in FIG. 11. The walls of ports 26, 32, 34, and 84 are provided with grooves, for example, groove 150, which mate with corresponding flanges on the conduits, for example, flange 152. The deformable nature of the elastic material comprising valve body 229 permits the conduit to be affixed to the valve body by inserting the conduit in the port until the flange 152 is positioned in groove 150. Groove 150 may be trapezoidal in cross section as shown in FIG. 10 so that the flow of the pressurized fluid through the port and conduit tends to seal the conduit in the port.

FIGS. 21 through 25 show, in detail, the simple, expeditious process for manufacturing the valves of the present invention.

FIGS. 21a, 21b, and 21c show a method of manufacturing a valve having a rigid valve body and a resilient valve spool of the type shown in FIG. 10. Mold 500, the internal dimensions of which correspond to those of the finished valve body 227, includes sprue 502, through which the valve body material in the liquid state is poured, and an end plate 504 which permits the removal of valve body 227 from mold 500. A core 506, corresponding to the desired configuration of cavity 50, is inserted in mold 500 through end plate 504. Core 506 is formed of resilient material that may be deformably removed from the molded valve body. If desired, core 506 may be formed of a nonresilient material that may be melted, flushed, or otherwise removed from the valve body.

To commence the manufacture of valve 207, the valve body material is poured into mold 500 through sprue 502 so as to fill the mold and surround core 506. See FIG. 21a. The material is allowed to harden, after which mold 500 is separated from end plate 504 and removed from the formed valve body 227.

Core 506 is then removed from valve body 227, as by stripping out a resilient core 506 (see FIG. 21b) or melting or otherwise removing a nonresilient core, to form cavity 50.

Resilient valve spool 247 is then inserted in cavity 50 by pressing the spool into valve body 227. See FIG. 21c. The hole through which core 506 was removed and spool 247 inserted may be reduced in size by a plug or other means to form a pilot port.

Valve spool 247 may be reduced in size, as by reducing the temperature of the spool, so as to permit insertion of the spool in the valve body 227.

In a somewhat analogous manner, a valve similar to valve 206 shown in FIG. 12, and having a resilient valve body 226 may be formed by pouring the resilient material in the molten or liquid state into mold 500 through sprue 502 to fill the mold and surround rigid core 5081. The resilient material is allowed to assume its resilient state after which the valve body is removed from the mold and the rigid core stripped from the body, as shown in FIG. 22a. Valve spool 246 is then pressed into the valve body to form the completed valve.

If desired, valve body 22 may be deformed by applying pressure to both ends of the valve spool, as by plates 510 shown in FIG. 23. This permits the removal of core 5081 and the insertion of the valve spool.

If desired, mold 500 may be left on the valve body to form the rigid shell 2031 shown in FIG. 6.

Actuating means, such as solenoid 180 may be encapsulated in valve body 22 by placing it inside mold 500 prior to pouring the valve body material into the mold. Spring 80 may be inserted in cavity 50 prior to the insertion of the valve spool in the valve body.

If it is desired to lap or otherwise finish the annular surfaces of the valve body and spool, a lapping or grinding compound 512 may be affixed to the annular surfaces of the valve spool 241 by a releasable medium 514, such as wax, prior to the insertion of the valve spool 241 in the valve body. See FIG. 24. A slot or hexagonal depression 516 is provided in each end of valve spool 241 so that the valve spool may be rotated by a tool inserted through pilot ports 84 and 85. Valve spool 24 is then inserted in valve body 22 and the body permitted to return to its normal recovered state.

The screwdriver 258 or other tool is inserted through the pilot port, for example, pilot port 84, and into slot 516 in one end of valve spool 241. Axial pressure is applied to valve spool 241 by screwdriver 258 to bring two of the annular surfaces of valve spool 241 into abutment with the respective valve seats of valve body 221. Valve spool 241 is then rotated by the screwdriver 258 so that the grinding compound 512 laps the annular surfaces and the valve seats.

When the lapping of the surfaces is completed, screwdriver 258 is inserted through pilot port 85 and the other two pairs of annular surfaces and valve seats lapped in a similar manner. The releasable medium and grinding compound are then drained from valve body 221, as by heating valve body 221, and the valve is ready for use.

Valve 20 may be manufactured by the investment-casting or "lost wax" process. While such process may be used to manufacture any of the valves described above, it is particularly suited for manufacturing the integrally constructed valve shown in FIG. 20, and is described in connection with such a valve. The process may also be used to manufacture the pilot operated valve shown in FIG. 11.

Mold 500 is provided with a three part investment casting, formed of an investment medium such as wax. See FIG. 25a. Two portions 520 and 522 of such investment-casting are in the shape of the pilot ports in the ends of valve body 220. The third portion 524 of the investment-casting is in the shape and form of the portions of cavity 50 not occupied by valve spool 240. The third portion 524 also includes members forming the fluid entrance and emission ports in valve body 2212.

To manufacture valve 2012 by the investment-casting process, the resilient material forming the valve is poured into mold 500, as shown in FIG. 25b, and allowed to assume the resilient state. Mold 500 is then removed and the investment-casting liquified and drained from valve body 2212 by heat, chemical, or other means, as shown in FIG. 25c, to form pilot ports 84 and 85 and cavity 50 and the fluid entrance and emission ports in valve body 2212. As noted previously, valve spool 2412 is integrally joined to valve body 2212 by diaphragms 312a and 312b.

In cases wherein the integral construction of valve 20 is not desired, a separate valve spool 24 may be incorporated in the investment casting, as shown in FIG. 25d. The investment-casting 5241 is formed in the shape of the portions of cavity 50 not occupied by valve spool 24 in the finished valve 20. The resilient material is poured into mold 500 and the investment-casting removed from valve body 22 in the same manner as previously described.

The investment-casting may be removed in two steps so as to permit an internal lapping of the valve seats of valve 201 by means of grinding compound applied to the inclined annular surfaces of valve spool 241. As shown in FIG. 25e, the investment-casting may include a thin layer of releasable medium 514 containing a grinding compound 512 on the inclined annular surfaces 117, 119, 121 and 123 of valve spool 241. Investment-casting 5241 is placed over releasable medium 514 and grinding compound 512. The releasable medium 514 and investment-casting 5241 are formed of substances which permit the separate removal of the former and the latter from valve body 221. For example, the investment-casting 5241 may be formed of a low temperature wax while releasable medium 514 is formed of a high temperature wax.

After valve body 221 has been formed, investment-casting 5241 is drained from valve body 221 by heating valve body 221 to a low temperature. This exposes releasable medium 514 containing grinding compound 512.

The annular surfaces and valve seats of valve 201 are lapped in the same manner as described above. Upon the completion of the lapping process, releasable medium 514 and grinding compound 512 are drained from valve body 221 as by heating valve body 221 to an elevated temperature to complete the manufacture of the valve.

I claim:
1. The method of making a valve for controlling the flow of pressurized fluid which comprises the steps of:
providing a unitary valve body having a normal physical configuration and having a plurality of fluid entrance and emission ports opening into a common confined cavity;
providing a flow control member having a normal physical configuration insertable into the common confined cavity of said valve body;.
inserting said flow control member in the valve body by causing a relative deformation between said valve body and said flow control member; and after insertion permitting the deforming member to return to its normal physical configuration.
2. The method according to claim 1 further defined as providing the valve body by molding said body about a core and removing the core.
3. The method according to claim 1 further defined as providing a valve body by molding the body about a core, deforming the valve body, removing the core from the deformed body, and inserting the flow control member in the cavity while the body is in its deformed condition; and permitting the body to return to its normal recovered state.
4. The method according to claim 1, further defined as inserting said flow control member, in the cavity by deforming the flow control member and allowing the flow control member to return to its physical configuration.

5. The method according to claim 1 further defined as inserting the flow control member in the cavity by deforming the valve body and allowing the valve body to return to its normal recovered state.

6. The method according to claim 1 further defined as including the step of coating portions of the flow control member with abrasive, rotating the flow control member under axial pressure after it is inserted in the valve body to lap the portions of the cavity forming the seats of the valve and said portions of said flow control member, and removing the abrasive from the flow control member and cavity.

7. The method of making a valve for controlling the flow of pressurized fluid which comprises the steps of:
 providing a flow control member;
 applying an investment medium to said flow control member in the form of the portions of a valve cavity not occupied by the flow control member;
 casting a valve body of resilient material about the flow control member;
 providing a plurality of fluid entrance and emission ports in the valve body; and
 removing the investment medium from the valve body to form the valve.

8. The method according to claim 7 including the additional step of coating portions of the fluid control member with abrasive prior to applying the investment medium, rotating the fluid control member under axial pressure after removing the investment medium to lap the portions of the cavity forming the seats of the valve and said portions of the fluid control member, and removing the abrasive from the cavity.